(12) United States Patent
Fujisaki et al.

(10) Patent No.: US 11,536,924 B2
(45) Date of Patent: Dec. 27, 2022

(54) OPTICAL ELEMENT DRIVING DEVICE, CAMERA AND PORTABLE ELECTRONIC DEVICE

(71) Applicant: AAC Optics Solutions Pte. Ltd., Singapore (SG)

(72) Inventors: Yoshifumi Fujisaki, Osaka (JP); Shikama Kazuo, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 497 days.

(21) Appl. No.: 16/719,990

(22) Filed: Dec. 19, 2019

(65) Prior Publication Data
US 2020/0326497 A1 Oct. 15, 2020

(30) Foreign Application Priority Data

Apr. 12, 2019 (JP) .............................. JP2019-076246

(51) Int. Cl.
| | | |
|---|---|---|
| *G02B 7/02* | (2021.01) | |
| *G03B 13/36* | (2021.01) | |
| *G02B 7/09* | (2021.01) | |

(52) U.S. Cl.
CPC ............... *G02B 7/02* (2013.01); *G03B 13/36* (2013.01); *G02B 7/09* (2013.01)

(58) Field of Classification Search
None
See application file for complete search history.

(56) References Cited

U.S. PATENT DOCUMENTS

2017/0336646 A1* 11/2017 Miller ................ H04N 5/23287

FOREIGN PATENT DOCUMENTS

| JP | 2002268748 A1 | 9/2002 |
|---|---|---|
| JP | 2007064063 A1 | 3/2007 |
| JP | 2007162612 A1 | 6/2007 |

\* cited by examiner

*Primary Examiner* — Darryl J Collins
*Assistant Examiner* — Tamara Y. Washington
(74) *Attorney, Agent, or Firm* — W&G Law Group

(57) ABSTRACT

An optical element driving device is provided, which includes: a fixing component as a base; an original position being a neutral position with respect to the fixing component; a movable component movable in two reversed directions with respect to the original position; a first shape memory alloy energized to move the movable component towards one of the two reversed directions; a second shape memory alloy energized to move the movable component towards the other one of the two reversed directions; and a safety mechanism device arranged between the fixing component and the movable component, for preventing the first shape memory alloy and the second shape memory from being broken. The fixing component and the movable component are connected by the first shape memory alloy and the second shape memory alloy. The optical element driving device can avoid damage of shape memory alloy and thus have high reliability.

13 Claims, 6 Drawing Sheets

United States Patent

US 11,536,924 B2

OPTICAL ELEMENT DRIVING DEVICE, CAMERA AND PORTABLE ELECTRONIC DEVICE

TECHNICAL FIELD

The present disclosure relates to an optical element driving device, a camera and a portable electronic device.

BACKGROUND

With rapid development of photographic technologies, optical element driving devices of optical devices are widely used in various photographic devices. It is particularly popular for consumers when an optical element driving device is applied to various portable electronic devices, such as mobile phones, tablets, etc.

A driving mechanism of an optical element driving device suitable for a general portable electronic device is usually used for automatic focus or hand shake correction, and an electromagnetic actuator for driving is known as a voice coil motor composed of a coil and a permanent magnet. Further, in recent years, a mechanism for using a shape memory alloy in an electromagnetic actuator has also been attracting attention, and it is possible to easily achieve such a mechanism. Besides, high output torque becomes extremely attractive. An alloy represented by Ni—Ti with a given length memory shape is assembled to a driving device at a normal temperature, and is contracted to a shape that is memorized due to heat generated by energizing two ends of the shape memory alloy. In the mechanism for automatic focus or hand shake correction, two shape memory alloys may be used so as to be able to be driven from a neutral position towards two directions that are mutually reversed. When driving toward one of the two directions, it is necessary to energize one of the two shape memory alloys and cut off energization of the other one, but one of the shape memory alloys is contracted and the other one is stretched within an elastic deformation range. Therefore, repeatedly driving towards two reversed directions causes the shape memory alloy to be repeatedly stretched and contracted, and thus there is a possibility that durability thereof is remarkably degraded.

Therefore, it needs to provide a new optical element driving device that can solve the above problems.

BRIEF DESCRIPTION OF DRAWINGS

Many aspects of the exemplary embodiment can be better understood with reference to the following drawings. Components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
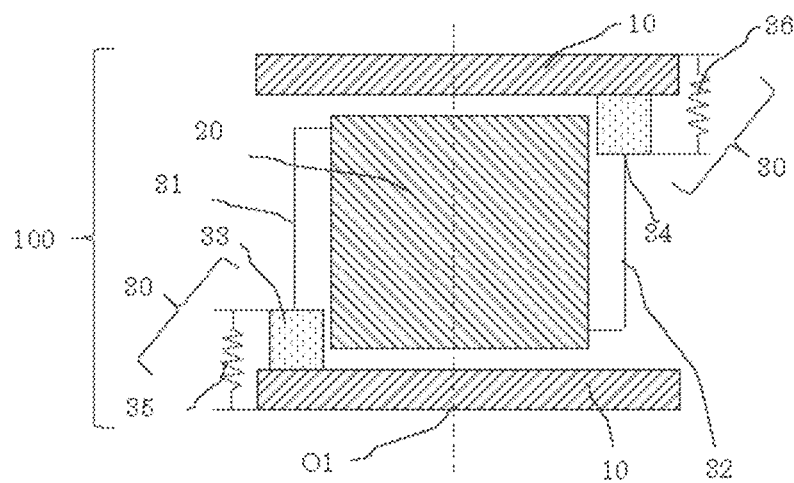
FIG. 1 is a schematic diagram illustrating a neutral position according to a first embodiment of the present disclosure.

In the following, the present disclosure will be described in details with reference to accompanying drawings.

FIG. 1 to FIG. 11 are schematic diagrams illustrating an optical element driving device 100 according to the present disclosure.

FIG. 1 to FIG. 5 are schematic diagrams showing a case in which an optical element driving device 100 and its compositions are applied to an autofocus mechanism according to a first embodiment of the present disclosure.

The optical element driving device 100 includes a fixing component 10 as a base, a lens block 20 as a movable component, and a pair of safety mechanism devices 30. The lens block 20 is axially supported by the fixing component 10 in a manner of being movable in parallel to a first optical axis O1. The lens block 20 is connected to the fixing component 10 via the safety mechanism device 30 and by two shape memory alloys A31 and B32, and can be driven from a neutral state shown in FIG. 1 towards two directions that are mutually reversed.

In addition, the pair of safety mechanism devices 30 include a sliding component A33 and another sliding component B34, and an extension spring A35 and another extension spring B36 as elastic components. The sliding component A33 and the sliding component B34 can slide respectively in mutually reversed directions parallel to a moving direction of the lens block 20, and are forced by the extension spring A35 and the extension spring B36 so as to abut against the fixing component 10 in mutually reversed directions.

Each of the shape memory alloy A31 and the shape memory alloy B32 has two ends that are electrically connected to a driving substrate (not shown). In such a manner, a circuit in which a signal from a controlling substrate causing a current to flow through two ends of each shape memory alloy is then formed.

Figure 2:
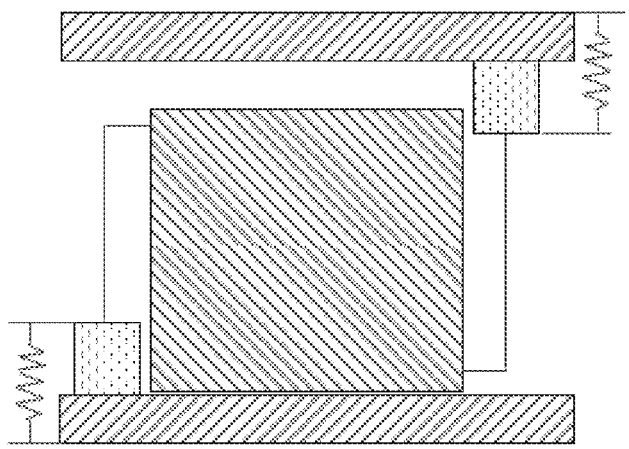
FIG. 2 is a schematic diagram illustrating a state in which a left side is energized according to the first embodiment of the present disclosure.

FIG. 2 is a schematic diagram illustrating a state in which the shape memory alloy A31 is contracted in a length direction and thus downwardly drives the lens block 20 when the shape memory alloy A31 is energized. The extension spring A35 of the safety mechanism device 30 is set to be less than a tensile load at a maximum contraction of the shape memory alloy A31, so that the sliding component A33 of the safety mechanism device 30 will not leave from the fixing component 10, and a contraction amount of the shape memory alloy A31 is equal to a movement amount of the lens block 20.

In addition, the shape memory alloy B32 at a reversed side is stretched from an original length. However, the extension spring B36 is set to be less than or equal to a breaking load exceeding elastic deformation of the shape memory alloy B32, so within the elastic deformation range and in a case where stretching reaches the breaking load exceeding elastic deformation shown in FIG. 2, with the safety mechanism device 30, as shown in FIG. 3, the sliding component B34 of the safety mechanism device 30 slides in a direction in which the shape memory alloy B32 is not further stretched with respect to the fixing component 10, thereby preventing breaking of the shape memory alloy B32.

Figure 3:
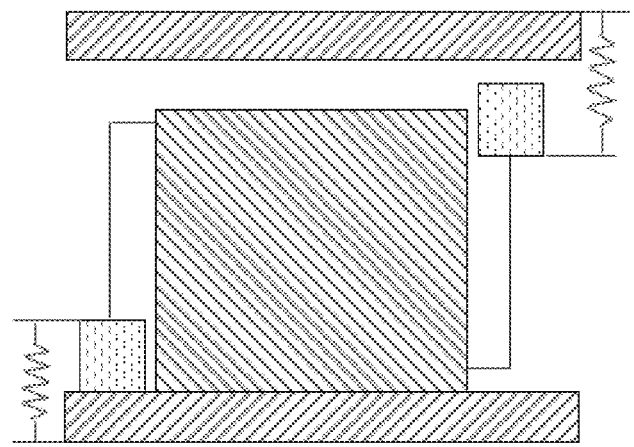
FIG. 3 is a schematic diagram illustrating a state in which a left side is energized and a safety mechanism device at a right side performs an action according to the first embodiment of the present disclosure.
Figure 4:
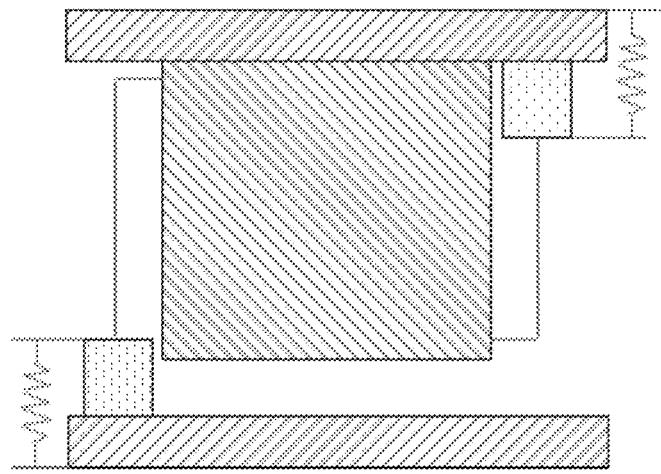
FIG. 4 is a schematic diagram illustrating a state in which a right side is energized according to the first embodiment of the present disclosure.

FIG. 4 illustrates a state in which energization of the shape memory alloy A31 is cut off from the state shown in FIG. 2 and FIG. 3, while energization of the shape memory alloy B32 is suddenly turned on. That is, it FIG. 4 illustrates a state in which the lens block 20 is driven toward an upper side in FIG. 4. Due to energization of the shape memory alloy B32, the shape memory alloy B32 is contracted in the length direction to drive the lens block 20 towards the upper side in FIG. 4. Since the shape memory alloy A31 is not energized, it returns to an original length by cooling. However, in a case where a reverse energization is suddenly turned on, since recovery of the shape memory alloy A31 by cooling takes longer time than contraction of the shape memory alloy B32, it is possible that it may be stretched with a breaking load exceeding the elastic deformation range as described above.

Figure 5:
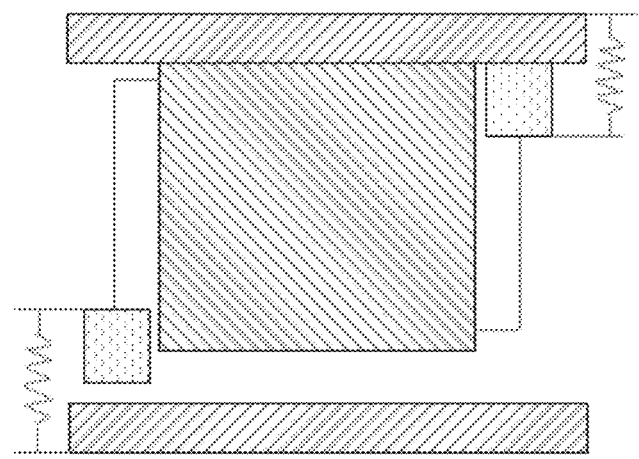
FIG. 5 is a schematic diagram illustrating a state in which a right side is energized and a safety mechanism device at a left side performs an action according to the first embodiment of the present disclosure.

In this case, the extension spring A35 of the safety mechanism device 30 is set to be less than or equal to the breaking load exceeding the elastic deformation, so within the elastic deformation range, as shown in FIG. 4, when it is stretched to exceed the breaking load exceeding the elastic deformation, with the safety mechanism device 30, as shown in FIG. 5, the fixing component 10 is separated from the sliding component A33, thereby preventing breaking of the shape memory alloy A32.

Thus, even if the shape memory alloy A31 and the shape memory alloy B32 are repeatedly driven in two reversed directions, durability is improved by the safety mechanism device 30, thereby providing an optical element driving device 100 having high reliability.

FIG. 6A to FIG. 6H are schematic diagrams according to various implementing manners of the first embodiment of the present disclosure.

The operation principle thereof is the same as that of the first embodiment.

Figure 6A:
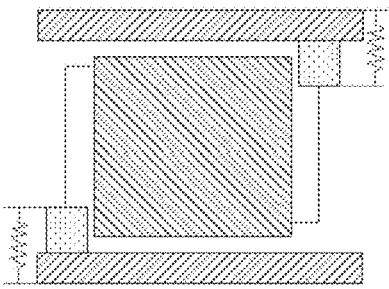
FIG. 6A to FIG. 6H are schematic diagrams illustrating neutral states according to various implementing manners of the first embodiment of the present disclosure.

FIG. 6A is a schematic diagram illustrating a neutral state according to a first embodiment.

Figure 6B:
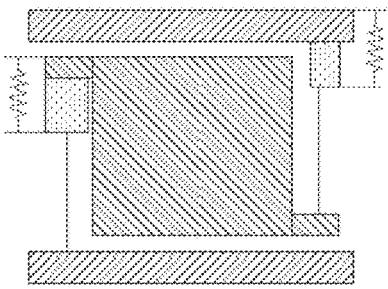

FIG. 6B is a schematic diagram illustrating a state in which, with respect to the first embodiment, the safety mechanism device 30 is arranged at a side of the lens block 20.

Figure 6C:
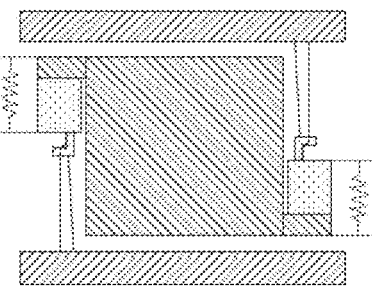

FIG. 6C is a schematic diagram illustrating a state in which, with respect to FIG. 6B, the shape memory alloy A31 and the shape memory alloy A32 are folded into a U shape, two ends of each of the shape memory alloy A31 and the shape memory alloy A32 are connected to a driving substrate (not shown) on the fixing component 10, and each U-shaped folded portion is hung on a respective hook portion 21 of the sliding component A33 and the sliding component B34 of the safety mechanism device 30. In this case, the contacts on the driving substrate (not shown) connected to two ends of each of the shape memory alloy A31 and the shape memory alloy B32 can be arranged in the vicinity, thereby achieving downsizing and simplification of the structure of the driving substrate.

Figure 6D:
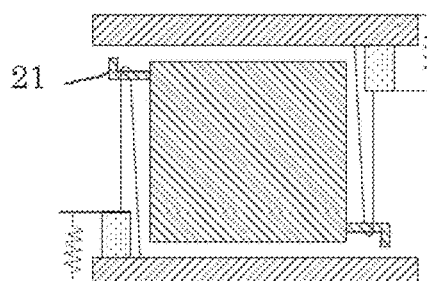

FIG. 6D is a schematic diagram illustrating a state in which, with respect to FIG. 6A, the shape memory alloy A31 and the shape memory alloy A32 are folded into a U shape, each of the shape memory alloy A31 and the shape memory alloy A32 has one end connected to a driving substrate (not shown) on the fixing component 10 and another end connected to a driving substrate (not shown) on the sliding component A33 and the sliding component B34 of the safety mechanism device 30, and each U-shaped folded portion is hung on a respective hook portion 21 of the lens block 20. In this case, the contacts on the driving substrate (not shown) connected to two ends of the shape memory alloy A31 and the shape memory alloy B32 can be arranged in the vicinity, thereby achieving downsizing and simplification of the structure of the driving substrate.

Figure 6E:
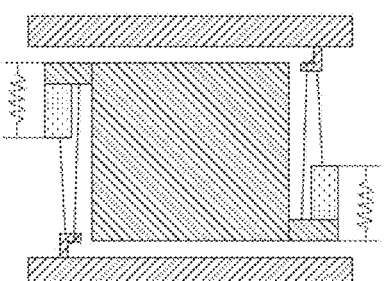

FIG. 6E is a schematic diagram illustrating a state in which, with respect to FIG. 6D, the safety mechanism device 30 is arranged at a side of the lens block 20.

Figure 6F:
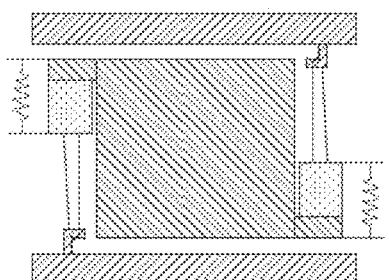

FIG. 6F is a schematic diagram illustrating a state in which, with respect to FIG. 6D, two ends of each of the shape memory alloy A31 and the shape memory alloy A32 are connected to a driving substrate (not shown) on the sliding component A33 and the sliding component B34 of the safety mechanism device 30.

Figure 6G:
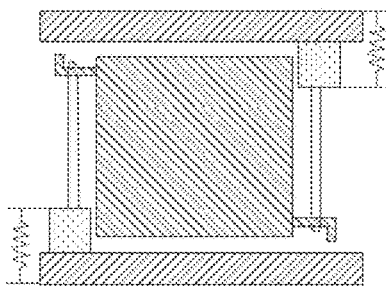

FIG. 6G is a schematic diagram illustrating a state in which, with respect to FIG. 6E, two ends of each of the shape memory alloy A31 and the shape memory alloy A32 are connected to a driving substrate (not shown) on the sliding component A33 and the sliding component B34 of the safety mechanism device 30.

Figure 6H:
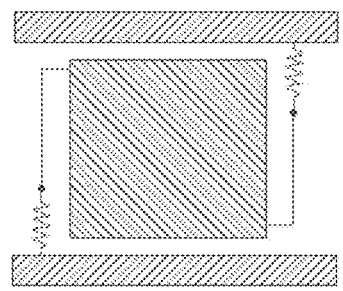
Figure 7:
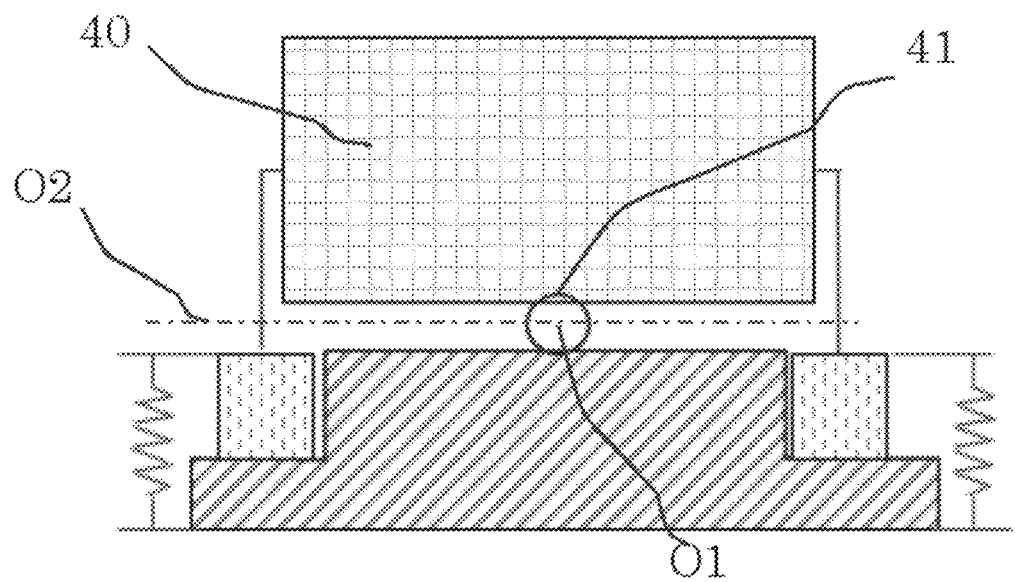
FIG. 7 is a schematic diagram illustrating a neutral state according to a second embodiment of the present disclosure.
Figure 8:
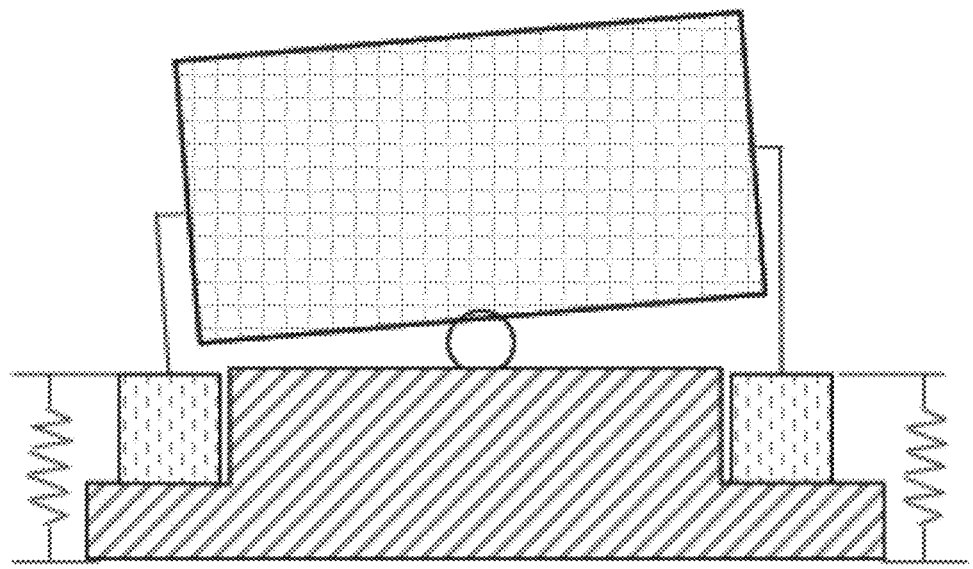
FIG. 8 is a schematic diagram illustrating a state in which a left side is energized according to the second embodiment of the present disclosure.
Figure 9:
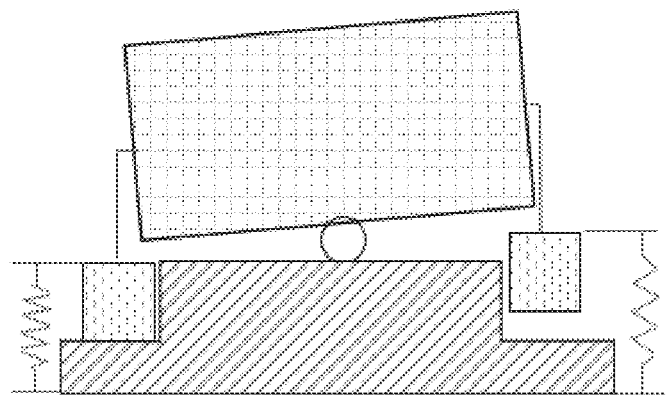
FIG. 9 is a schematic diagram illustrating a state in which a left side is energized and a safety mechanism device at a right side performs an action according to the second embodiment of the present disclosure.
Figure 10:
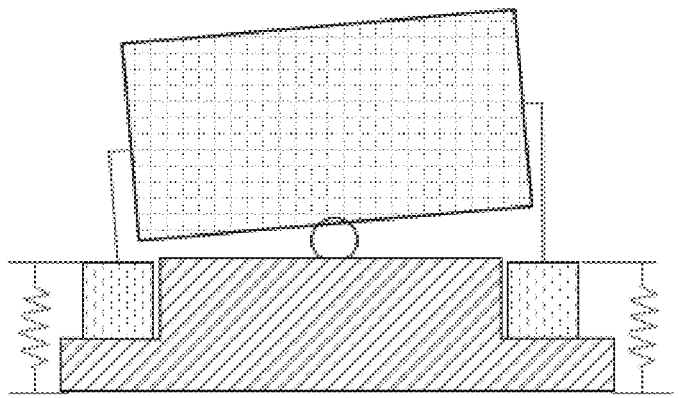
FIG. 10 is a schematic diagram illustrating a state in which a right side is energized according to the second embodiment of the present disclosure.
Figure 11:
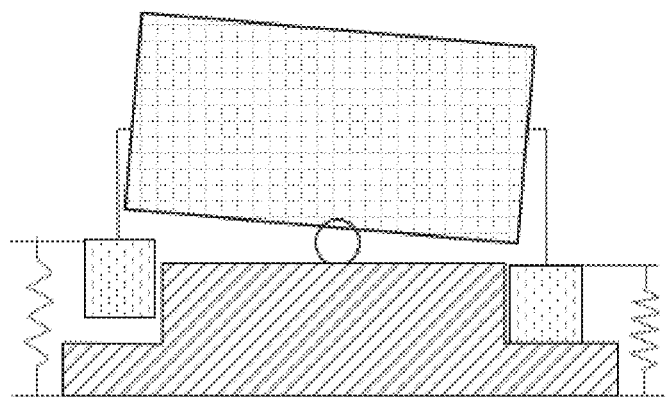
FIG. 11 is a schematic diagram illustrating a state in which a right side is energized and a safety mechanism device at a left side performs an action according to the second embodiment of the present disclosure.

FIG. 6H is a schematic diagram illustrating a state in which, with respect to FIG. 6A, the sliding component A33 and the sliding component B34 of the safety mechanism device 30 are removed, and each of the shape memory alloy A31 and the shape memory alloy A32 has one end respectively connected to an extension spring A35 and an extension spring B36.

FIGS. 7 to 11 are schematic diagrams illustrating a mechanism in which the optical device and its compositions are replaced with a reflection component 40 (for example, a reflecting mirror or a prism), and the reflection component 40 rotates about a first optical axis O1 as a fulcrum of a pivot according to a second embodiment of the present disclosure.

The operation principle thereof is the same as that of the first embodiment.

This rotation axis may also be applied to, for example, an orthogonal second optical axis O2, thereby capable of being applied to a hand shake correction mechanism with two axes.

In the present disclosure, position detection during driving of the shape memory alloy may adopt detection of variations in a resistance value between terminals of the shape memory alloy or adopt magnetic detection using a Hall sensor and a permanent magnet.

Figure 12:
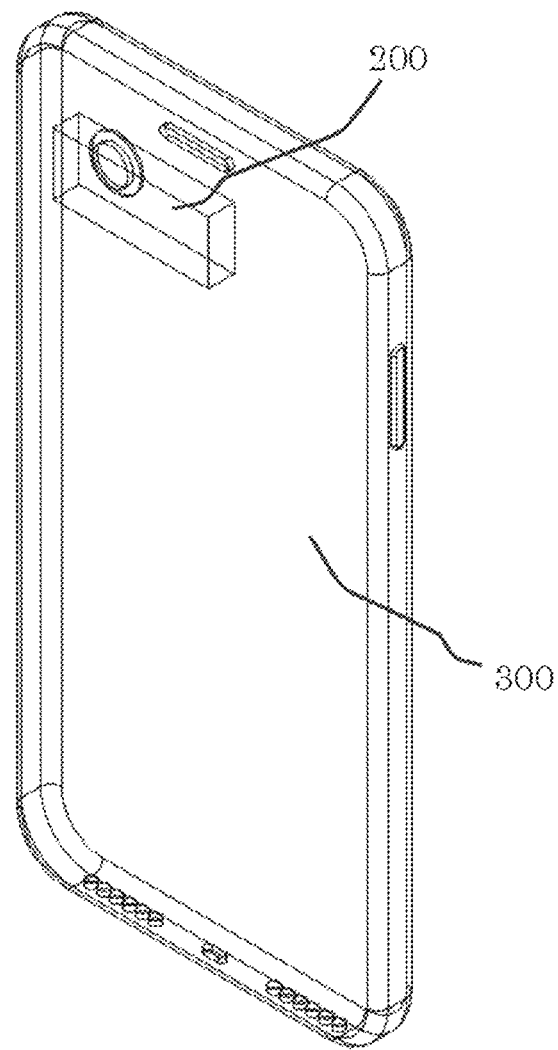
FIG. 12 is schematic diagram illustrating a portable electronic device (portable information terminal) having an optical element driving device according to the present disclosure.

The above-mentioned optical element driving device 100 may also be used in, for example, a photographic device 200 for a portable information device 300, such as a smart cellphone, a functional cellphone or tablet device as shown in FIG. 12.

The above description is merely related to preferred embodiments of the present disclosure, which do not make limitations to the scope of the present disclosure, and all equivalent modifications or variations made by those skilled in the art based on the present disclosure shall fall into the protection scope of the present disclosure.

REFERENCE SIGNS

10 fixing component as base
20 lens block
21 hook portion
30 safety mechanism device
31 shape memory alloy A
32 shape memory alloy B
33 sliding component A
34 sliding component B
35 extension spring A
36 extension spring B
40 reflection component
41 pivot
100 optical element driving device
200 photographic device
300 portable information device
O1 first optical axis
O2 second optical axis

What is claimed is:

1. An optical element driving device, comprising:
a fixing component as a base;
an original position being a neutral position with respect to the fixing component;
a movable component movable in two reversed directions with respect to the original position;
a first shape memory alloy energized to move the movable component towards one of the two reversed directions;
a second shape memory alloy energized to move the movable component towards the other one of the two reversed directions; and
a safety mechanism device arranged between the fixing component and the movable component, for preventing the first shape memory alloy and the second shape memory alloy from being broken,
wherein the fixing component and the movable component are connected by the first shape memory alloy and the second shape memory alloy;
wherein the safety mechanism device is coupled to the fixing component or the movable component by a force applied by an elastic component, and the applied force is larger than a force generated by shape recovering of any one of the first shape memory alloy and the second shape memory alloy when being energized.

2. The optical element driving device as described in claim 1, wherein the applied force is smaller than an allowable load of elastic deformation in a case where the first shape memory alloy and the second shape memory alloy are respectively stretched without being energized.

3. The optical element driving device as described in claim 1, wherein the applied force is smaller than an allowable load of elastic deformation in a case where the first shape memory alloy and the second shape memory alloy are respectively stretched without being energized.

4. The optical element driving device as described in claim 1, wherein each of the first shape memory alloy and the second shape memory alloy has one end connected to the safety mechanism device, and another end connected to the fixing component or the movable component.

5. The optical element driving device as described in claim 1, wherein each of the first shape memory alloy and the second shape memory alloy has one end connected to the safety mechanism device, and another end connected to the fixing component or the movable component.

6. The optical element driving device as described in claim 1, wherein each of the first shape memory alloy and the second shape memory alloy has two ends connected to the safety mechanism device or connected to one of the fixing component and the movable component, and each of the first shape memory alloy and the second shape memory alloy has a middle portion folded into a U shape that is supported by the safety mechanism device or supported by one of the fixing component and the movable component.

7. The optical element driving device as described in claim 1, wherein each of the first shape memory alloy and the second shape memory alloy has two ends connected to the safety mechanism device or connected to one of the fixing component and the movable component, and each of the first shape memory alloy and the second shape memory alloy has a middle portion folded into a U shape that is supported by the safety mechanism device or supported by one of the fixing component and the movable component.

8. The optical element driving device as described in claim 1, wherein the movable component is axially supported with respect to the fixing component in a manner of being movable in an axial direction and being movable in two directions with respect to the original neutral position.

9. The optical element driving device as described in claim 1, wherein the movable component is axially supported with respect to the fixing component in a manner of being movable in an axial direction and being movable in two directions with respect to the original neutral position.

10. The optical element driving device as described in claim 1, wherein the movable component is axially supported with respect to the fixing component in a manner of being rotatable in two directions from the original neutral position.

11. The optical element driving device as described in claim 1, wherein the movable component is axially supported with respect to the fixing component in a manner of being rotatable in two directions from the original neutral position.

12. A camera, comprising the optical element driving device as described in claim 1.

13. A portable electronic device, comprising the camera as described in claim 12.

* * * * *